Oct. 5, 1954     D. J. RUST     2,690,779
INNER TUBE FOR PNEUMATIC TIRE CASINGS

Filed June 23, 1953

Duyane J. Rust
INVENTOR.

BY *Clarence A. O'Brien
and Harvey B. Jackson*
Attorneys

Patented Oct. 5, 1954

2,690,779

UNITED STATES PATENT OFFICE 2,690,779

INNER TUBE FOR PNEUMATIC TIRE CASINGS

Duyane J. Rust, Houston, Tex.

Application June 23, 1953, Serial No. 363,555

4 Claims. (Cl. 152—331)

My invention relates to improvements in inner tubes for the casings of pneumatic tires especially, but not necessarily, of heavy earth working machines.

The primary object of my invention is to provide an improved inner tube which, at the ground engaging portion of the tire casing will, under impact and compression, provide for greater cushioning action and less rebound at said portion than conventional inner tubes.

Another object is to accomplish the above by providing an inner tube with a novel arrangement of an inner circumferential air chamber and separate outer circumferential air chambers, the inner and outer air chambers communicating by way of ports and valves so arranged that under impact of the tire with the ground, the portion of the tube at the ground engaging portion of the tire casing will become partly deflated by compression to provide for maximum cushioning action at said ground engaging portion, and then, will become slowly fully reinflated with a retarded action whereby to reduce rebound to a minimum.

Still another object is to provide in conjunction with such air chambers improved deflation control flap valves built into the inner air chamber structure and obviating the use of separate deflation control valves.

Other and subordinate objects, within the purview of my invention, together with the precise nature of my improvements, will become readily apparent when the succeeding description and claims are read with reference to the drawing accompanying and forming part of this specification.

Figure 1:
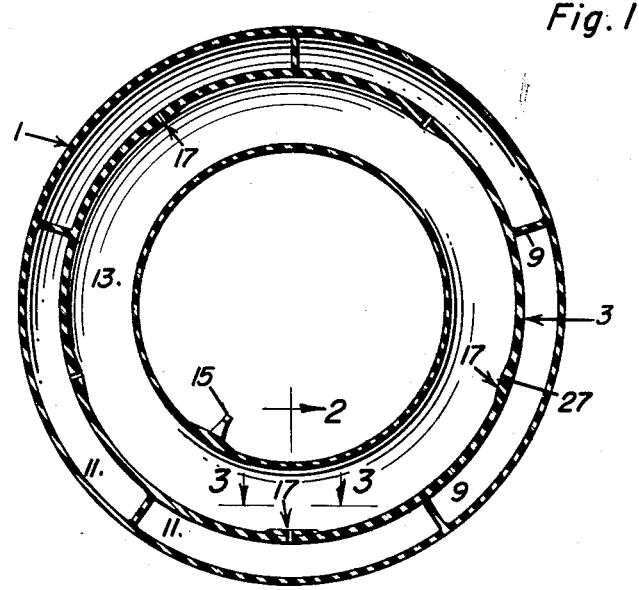
Figure 1 is a view in vertical section of an inner tube embodying my improvements.
Figure 3:
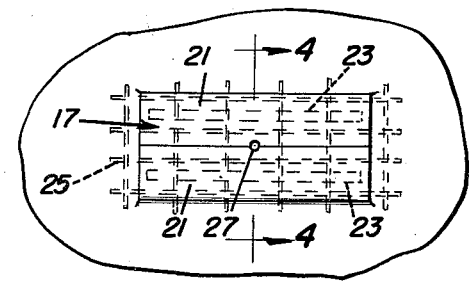
Figure 3 is an enlarged fragmentary view in horizontal section taken on the line 3—3 of Figure 1.
Figure 2:
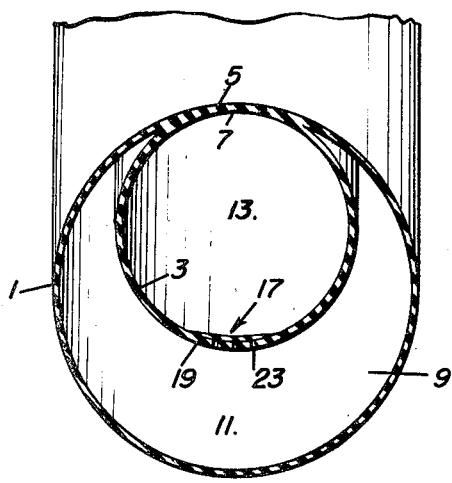
Figure 2 is an enlarged fragmentary view in transverse section taken on the line 2—2 of Figure 1.
Figure 4:
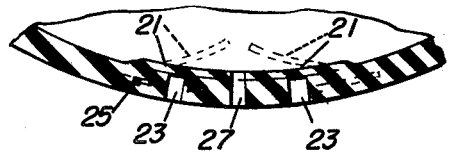
Figure 4 is a further enlarged fragmentary view in transverse section taken on the line 4—4 of Figure 3.

Referring to the drawing by numerals, according to my invention, an inner tube is provided comprising an outer annular, tubular section 1 and a relatively smaller diameter, inner tubular section 3 integrally joined together at the inner circumferential portions 5, 7 of said sections solely.

Radial partitions 9 spaced circumferentially in the outer section 1 and connecting said sections 1, 3 form together with the sections 1, 3 circumferentially spaced, segmental, outer air chambers 11 in the outer section 1, whereas, the inner section 3 forms an inner continuous annular air chamber 13 extending around the inner circumferential portion of the outer section 1. The sections 1, 3 and partitions 9 may be formed of any suitable rubber composition, reinforced, or otherwise, and in any suitable manner.

The conventional tire inflation valve 15 is suitably fixed in the inner circumferential portions 5, 7 in communication with the inner air chamber 13 for inflating said inner chamber, and thereby inflating the outer chamber 11 from the inner chamber 13 by means presently described.

A deflation control flap valve 17 is provided in the outer circumferential portion 19 of the inner section 3 between the inner chamber 13 and each outer chamber 11. Each deflation control valve 17 comprises a pair of opposite, rectangular, inwardly opening valve flaps 21 inside the inner chamber 13 spaced apart crosswise of the inner section 3 and formed integrally with said section. The flaps 21 close in edge-to-edge relation, under pressure, in the inner chamber 13, and close over a pair of circumferential air discharge slots 23 in said section 3 for each outer air chamber 11. A metal reinforcing, screen-like frame 25 in the outer circumferential portion 19 of the inner section 3 is provided at each pair of slots 23 and opposite each pair of flaps 21.

A comparatively small bleed port 27 in the center of and associated with each valve 17 provides for inflation of the outer chambers 11 from the inner chamber 13, by passing through portion 19.

The described inner tube operates as follows:

Air under pressure is introduced into the inner air chamber 13 to inflate the same, and passes through the bleed ports 27 to inflate the outer chambers 11 so that air pressure may be equalized in said chambers. When a tire casing, not shown, having my improved tube therein impacts the ground, the outer air chamber 11 at the ground engaging tread portion of the tire becomes deformed by compression and thereby is partly deflated by opening of the associated valve 17 to quickly pass air under pressure from said chamber 11 into the inner air chamber 13. The associated valve 17 remains open until the increase in pressure in the inner chamber, over that in the partly collapsed chamber, closes said valve. The bleed port 27 associated with the valve 17 slowly bleeds pressure from the inner air chamber 13 back into the partly deflated outer chamber 11 until the pressure in said chambers is again equalized. Thus, the tube at the partly deflated portion thereof, and hence of the tire, is reinflated with a retarded action to obviate rebound. It is to be noted that, because the inner section 3 is connected to the outer section 1, at the inner circumferential portions 7, 3 of said sections only, the inner section 3 in no way restricts, or interferes with the expansion and flexing of the outer section 1. The partitions 9 confine partial deflation to the tread engaging portion of the tire, but, being flexible, do not interfere with smooth rolling of the tire.

The foregoing will, it is believed, suffice to impart a clear understanding of my invention, without further explanation.

Manifestly, the invention, as described, is susceptible of modification without departing from the inventive concept, and right is herein reserved to such modifications as fall within the scope of the appended claims.

Having described my invention, what is claimed as new is:

1. A flexible inner tube for a pneumatic tire casing comprising an outer tubular annular section, an inner tubular annular section in the outer section relatively smaller in diameter and extending around the inner circumferential portion of the outer section, said sections having integrally formed inner circumferential portions attaching said sections together, circumferentially spaced radial partitions in the outer section connecting said sections, said inner section forming an inner annular air chamber in the inner circumferential portion of the outer section, said partitions and sections forming circumferential segmental air chambers in the outer segmental portion of said outer section, means for introducing air under pressure into said sections to inflate the same including bleed ports in the inner section communicating with the outer chambers for retarded inflation of the outer chambers by air in said inner chamber, and valve means in said inner section operative by increase of air pressure in any outer chamber caused by compression of said chamber to pass air from the compressed chamber into the inner chamber.

2. A tube according to claim 1, said valve means comprising slots in said inner section, and slot closing flaps in said inner chamber opening inwardly of said inner chamber.

3. A tube according to claim 2, said flaps being formed integrally with said inner section.

4. A tube according to claim 3, and a reinforcing frame in said inner section opposite said slots.

References Cited in the file of this patent

UNITED STATES PATENTS

| Number | Name | Date |
|---|---|---|
| 1,552,106 | Andre | Sept. 1, 1925 |
| 2,553,319 | Hruska | May 15, 1951 |